US008678986B2

(12) United States Patent
Wnek

(10) Patent No.: US 8,678,986 B2
(45) Date of Patent: Mar. 25, 2014

(54) METHOD FOR POSITIONING AND OPERATING UPON A CONSTRUCT

(75) Inventor: Patrick H. Wnek, Sherwood, WI (US)

(73) Assignee: Graphic Packaging International, Inc., Atlanta, GA (US)

(*) Notice: Subject to any disclaimer, the term of this patent is extended or adjusted under 35 U.S.C. 154(b) by 352 days.

(21) Appl. No.: 12/980,472

(22) Filed: Dec. 29, 2010

(65) Prior Publication Data

US 2011/0160028 A1 Jun. 30, 2011

Related U.S. Application Data

(60) Provisional application No. 61/335,040, filed on Dec. 30, 2009.

(51) Int. Cl.
*B31B 43/00* (2006.01)
*B29C 31/00* (2006.01)

(52) U.S. Cl.
USPC ........ 493/143; 425/397; 425/400; 425/403.1; 493/167; 493/174; 493/417

(58) Field of Classification Search
CPC ................. B31B 2201/223; B31B 2201/0252; B31B 3/02; B31B 43/00
USPC ........... 493/52, 143, 167, 168, 174, 180, 181, 493/400, 416, 417, 472, 902; 425/157, 182, 425/302, 305.1, 35.2, 397, 400, 403.1; 264/40.7, 160; 100/215
See application file for complete search history.

(56) References Cited

U.S. PATENT DOCUMENTS

| | | | | |
|---|---|---|---|---|
| 228,554 | A | 6/1880 | Perkins et al. | |
| 584,633 | A | 6/1897 | Gottlieb | |
| 1,022,882 | A | 4/1912 | Schwenn | |
| 1,212,182 | A * | 1/1917 | Brooks | 493/167 |
| 1,733,445 | A | 10/1929 | Burns | |
| 1,838,061 | A | 12/1931 | Schwaerzer | |
| 2,026,403 | A * | 12/1935 | Schlemmer | 493/152 |

(Continued)

FOREIGN PATENT DOCUMENTS

| | | |
|---|---|---|
| DE | 509 065 C | 11/1931 |
| DE | 80 11 020 U1 | 9/1980 |

(Continued)

OTHER PUBLICATIONS

Office Action dated Nov. 2, 2012, in U.S. Appl. No. 12/817,377.

(Continued)

*Primary Examiner* — Stephen F Gerrity
(74) *Attorney, Agent, or Firm* — Womble Carlyle Sandridge & Rice, LLP

(57) ABSTRACT

An apparatus for operating upon a construct. In one example, the apparatus comprises a tool, a feed path for a feed path for feeding the construct to and withdrawing the construct from the tool, and a positioning mechanism. The positioning mechanism comprises an arm positioned proximate to the tool and a guide for directing the construct toward the tool. The arm is movable between a guiding position and a withdrawn position, and the guide is mounted to the arm for moving with the arm so that the guide is at least partially disposed in the feed path when the arm is in the guiding position. A recess is defined in the tool for at least partially accommodating the guide.

26 Claims, 6 Drawing Sheets

(56) References Cited

U.S. PATENT DOCUMENTS

| | | | | | |
|---|---|---|---|---|---|
| 2,522,397 | A | | 9/1950 | Palmer | |
| 2,609,776 | A | * | 9/1952 | Sahlin | 100/215 |
| 2,634,880 | A | | 4/1953 | Gravatt | |
| 2,731,860 | A | | 1/1956 | Schaming | |
| 3,033,434 | A | | 5/1962 | Carson | |
| 3,099,377 | A | | 7/1963 | Metzler et al. | |
| 3,195,770 | A | | 7/1965 | Robertson | |
| 3,220,631 | A | | 11/1965 | Reifers | |
| 3,229,886 | A | | 1/1966 | Grogel | |
| 3,286,876 | A | | 11/1966 | Ring | |
| 3,530,917 | A | | 9/1970 | Donovan | |
| 3,669,305 | A | | 6/1972 | Kinney et al. | |
| 3,680,733 | A | | 8/1972 | Winslow | |
| 3,684,633 | A | | 8/1972 | Haase | |
| 3,850,340 | A | | 11/1974 | Siemonsen et al. | |
| 3,968,921 | A | | 7/1976 | Jewell | |
| 4,051,707 | A | | 10/1977 | Valek et al. | |
| 4,073,391 | A | | 2/1978 | O'Brien et al. | |
| 4,096,947 | A | | 6/1978 | Morse | |
| 4,139,115 | A | | 2/1979 | Robinson | |
| 4,183,435 | A | | 1/1980 | Thompson et al. | |
| 4,202,464 | A | | 5/1980 | Mohs et al. | |
| 4,358,263 | A | | 11/1982 | Shiraishi et al. | |
| 4,435,143 | A | | 3/1984 | Dempsey | |
| 4,484,703 | A | * | 11/1984 | Kawasaki et al. | 493/167 |
| 4,571,320 | A | * | 2/1986 | Walker | 264/40.1 |
| 4,606,496 | A | | 8/1986 | Marx et al. | |
| 4,609,140 | A | | 9/1986 | Van Handel et al. | |
| 4,645,155 | A | | 2/1987 | Eldon et al. | |
| 4,648,528 | A | | 3/1987 | LaBarge et al. | |
| 4,690,787 | A | * | 9/1987 | Fasnacht | 425/397 |
| 4,704,510 | A | | 11/1987 | Matsui | |
| 4,721,499 | A | | 1/1988 | Marx et al. | |
| 4,721,500 | A | | 1/1988 | Van Handel et al. | |
| 4,755,128 | A | * | 7/1988 | Alexander et al. | 425/292 |
| 4,775,771 | A | | 10/1988 | Pawlowski et al. | |
| 4,781,566 | A | * | 11/1988 | Rossi et al. | 425/400 |
| 4,832,676 | A | | 5/1989 | Johns et al. | |
| 4,865,921 | A | | 9/1989 | Hollenberg et al. | |
| 4,890,439 | A | | 1/1990 | Smart | |
| 4,935,089 | A | | 6/1990 | Schirmer | |
| 4,936,935 | A | | 6/1990 | Beckett | |
| 4,944,668 | A | * | 7/1990 | Asano et al. | 425/397 |
| 4,963,424 | A | | 10/1990 | Beckett | |
| 4,967,908 | A | | 11/1990 | Kessler | |
| 5,039,364 | A | | 8/1991 | Beckett et al. | |
| 5,041,071 | A | * | 8/1991 | Reasinger et al. | 493/167 |
| 5,098,363 | A | * | 3/1992 | Reasinger et al. | 493/167 |
| 5,117,078 | A | | 5/1992 | Beckett | |
| 5,129,874 | A | | 7/1992 | Hayes, III et al. | |
| 5,190,209 | A | | 3/1993 | Gordon et al. | |
| 5,213,902 | A | | 5/1993 | Beckett | |
| 5,221,419 | A | | 6/1993 | Beckett | |
| 5,260,537 | A | | 11/1993 | Beckett | |
| 5,266,386 | A | | 11/1993 | Beckett | |
| 5,269,717 | A | | 12/1993 | Tardif | |
| 5,309,749 | A | | 5/1994 | Stodd | |
| RE34,683 | E | | 8/1994 | Maynard et al. | |
| 5,340,436 | A | | 8/1994 | Beckett | |
| 5,354,973 | A | | 10/1994 | Beckett | |
| 5,410,135 | A | | 4/1995 | Pollart et al. | |
| 5,424,517 | A | | 6/1995 | Habeger, Jr. et al. | |
| 5,519,195 | A | | 5/1996 | Keefer et al. | |
| 5,617,972 | A | | 4/1997 | Morano et al. | |
| 5,628,921 | A | | 5/1997 | Beckett | |
| 5,672,407 | A | | 9/1997 | Beckett | |
| 5,735,785 | A | | 4/1998 | Lucas et al. | |
| 5,755,824 | A | | 5/1998 | Blechschmidt et al. | |
| 5,758,773 | A | | 6/1998 | Clements | |
| 5,759,422 | A | | 6/1998 | Schmelzer et al. | |
| 5,782,376 | A | | 7/1998 | Brauner et al. | |
| 5,800,724 | A | | 9/1998 | Habeger et al. | |
| 5,934,472 | A | | 8/1999 | Ramirez et al. | |
| 5,938,112 | A | | 8/1999 | Sandstrom | |
| 6,093,460 | A | | 7/2000 | Iwaya | |
| 6,114,679 | A | | 9/2000 | Lai et al. | |
| 6,150,646 | A | | 11/2000 | Lai et al. | |
| 6,204,492 | B1 | | 3/2001 | Zeng et al. | |
| 6,213,301 | B1 | | 4/2001 | Landis et al. | |
| 6,251,451 | B1 | | 6/2001 | Zeng | |
| 6,284,101 | B1 | * | 9/2001 | Marx | 162/199 |
| 6,325,213 | B1 | | 12/2001 | Landis, II | |
| 6,414,290 | B1 | | 7/2002 | Cole et al. | |
| 6,415,945 | B1 | | 7/2002 | Zank et al. | |
| 6,433,322 | B2 | | 8/2002 | Zeng et al. | |
| 6,455,827 | B2 | | 9/2002 | Zeng | |
| 6,552,315 | B2 | | 4/2003 | Zeng et al. | |
| 6,568,534 | B2 | | 5/2003 | Zank | |
| 6,592,357 | B1 | | 7/2003 | Johns et al. | |
| 6,677,563 | B2 | | 1/2004 | Lai | |
| 6,715,630 | B2 | | 4/2004 | Littlejohn et al. | |
| 6,717,121 | B2 | | 4/2004 | Zeng et al. | |
| 6,765,182 | B2 | | 7/2004 | Cole et al. | |
| 6,893,693 | B2 | | 5/2005 | Swoboda et al. | |
| 6,907,316 | B2 | | 6/2005 | Bader et al. | |
| 6,988,654 | B2 | | 1/2006 | Wnek | |
| 7,048,176 | B2 | | 5/2006 | Littlejohn et al. | |
| 7,169,346 | B2 | | 1/2007 | Johns et al. | |
| 7,337,943 | B2 | | 3/2008 | Johns et al. | |
| 7,365,292 | B2 | | 4/2008 | Cole et al. | |
| 7,419,462 | B1 | | 9/2008 | Zelinski | |
| 7,482,053 | B2 | | 1/2009 | Swiontek | |
| 7,540,833 | B2 | | 6/2009 | Johns et al. | |
| 7,819,790 | B2 | | 10/2010 | Grischenko et al. | |
| 7,862,318 | B2 | | 1/2011 | Middleton et al. | |
| 7,914,432 | B2 | | 3/2011 | Zelinski | |
| 8,047,834 | B2 | | 11/2011 | Sofronie et al. | |
| 2002/0092791 | A1 | | 7/2002 | Wnek | |
| 2002/0152783 | A1 | * | 10/2002 | Kleber et al. | 72/60 |
| 2003/0205319 | A1 | | 11/2003 | Bengtsson et al. | |
| 2003/0214076 | A1 | * | 11/2003 | Johns et al. | 264/320 |
| 2004/0069788 | A1 | | 4/2004 | Johns | |
| 2004/0262322 | A1 | | 12/2004 | Middleton et al. | |
| 2005/0109653 | A1 | | 5/2005 | Wnek et al. | |
| 2005/0156342 | A1 | * | 7/2005 | Harper et al. | 425/403.1 |
| 2006/0183617 | A1 | * | 8/2006 | Alexander et al. | 493/70 |
| 2006/0198972 | A1 | | 9/2006 | Ueda et al. | |
| 2007/0081743 | A1 | | 4/2007 | Kim | |
| 2007/0262487 | A1 | | 11/2007 | O'Hagan et al. | |
| 2007/0267374 | A1 | | 11/2007 | Middleton et al. | |
| 2008/0047958 | A1 | | 2/2008 | Cole et al. | |
| 2009/0223952 | A1 | | 9/2009 | Wnek et al. | |
| 2009/0264269 | A1 | * | 10/2009 | Monti | 493/52 |
| 2010/0323864 | A1 | | 12/2010 | Wnek | |

FOREIGN PATENT DOCUMENTS

| | | | |
|---|---|---|---|
| DE | 87 13 290 | U1 | 11/1987 |
| DE | 37 37 052 | A1 | 5/1989 |
| DE | 296 02 348 | U1 | 3/1996 |
| DE | 101 49 143 | A1 | 4/2003 |
| EP | 0 082 209 | A2 | 6/1983 |
| EP | 1 332 972 | A2 | 8/2003 |
| FR | 2 266 638 | A1 | 10/1975 |
| FR | 2 599 002 | A1 | 11/1987 |
| FR | 2 733 715 | A1 | 11/1996 |
| GB | 1 264 484 | | 2/1972 |
| GB | 1 348 370 | | 3/1974 |
| GB | 1 376 603 | | 12/1974 |
| GB | 2 171 048 | A | 8/1986 |
| JP | 47-23456 | | 10/1972 |
| JP | 54-116059 | A | 9/1979 |
| JP | 54-126887 | U | 9/1979 |
| JP | 56-65866 | U | 6/1981 |
| JP | S57-32723 | | 1/1982 |
| JP | 59-75004 | | 4/1984 |
| JP | S63-283950 | | 11/1988 |
| JP | 03-004582 | | 1/1991 |
| JP | 3031361 | A | 2/1991 |
| JP | 3057020 | U | 5/1991 |
| JP | 6000843 | A | 1/1994 |
| JP | 6096234 | A | 4/1994 |
| JP | 07-028883 | | 1/1995 |
| JP | 08-156944 | | 6/1996 |

(56) References Cited

FOREIGN PATENT DOCUMENTS

| | | | |
|---|---|---|---|
| JP | 8-337234 | A | 12/1996 |
| JP | 8-337235 | | 12/1996 |
| JP | 09-254948 | | 9/1997 |
| JP | 2000-43840 | A | 2/2000 |
| JP | 2000-142825 | A | 5/2000 |
| JP | 2000-238760 | A | 9/2000 |
| JP | 2000-335550 | A | 12/2000 |
| JP | 2000-517260 | T | 12/2000 |
| JP | 2001-121625 | | 5/2001 |
| JP | 2001-213420 | A | 8/2001 |
| JP | 2001-328617 | A | 11/2001 |
| JP | 2006-130870 | | 5/2006 |
| KR | 20-0367200 | Y1 | 11/2004 |
| WO | WO 96/11142 | A2 | 4/1996 |
| WO | WO 98/09812 | A1 | 3/1998 |
| WO | WO 03/066435 | A2 | 8/2003 |
| WO | WO 03/078012 | A1 | 9/2003 |
| WO | WO 2004/033324 | A1 | 4/2004 |
| WO | WO 2008/049048 | A2 | 4/2008 |
| WO | WO 2009/086501 | A2 | 7/2009 |
| WO | WO 2009/088904 | A2 | 7/2009 |

OTHER PUBLICATIONS

International Search Report and Written Opinion dated Sep. 5, 2011 for PCT/US2010/062303.

English Translation of Notification of Reason for Refusal for corresponding Japanese Patent Application No. 2012-547257, dispatched Nov. 12, 2013, 4 pages.

* cited by examiner

METHOD FOR POSITIONING AND OPERATING UPON A CONSTRUCT

CROSS-REFERENCE TO RELATED APPLICATION

This application claims the benefit of U.S. Provisional Patent Application No. 61/335,040, filed Dec. 30, 2009.

INCORPORATION BY REFERENCE

U.S. Provisional Patent Application No. 61/335,040, which was filed on Dec. 30, 2009, is hereby incorporated by reference for all purposes as if presented herein in its entirety.

BACKGROUND OF THE DISCLOSURE

The present disclosure relates to tools and methods for forming materials into articles, elements, constructs, or containers that may be used to hold, contain, or prepare food products or other products.

SUMMARY OF THE DISCLOSURE

In one aspect, the disclosure is generally directed to an apparatus for operating upon a construct (e.g., a bowl, tray, plate, or any other suitable type of container (e.g., a press-formed paperboard container) or support). In one example, the apparatus comprises a tool, a feed path for feeding the construct to and withdrawing the construct from the tool, and a positioning mechanism. In one example, the positioning mechanism comprises an arm positioned proximate to the tool and a guide for directing the construct toward the tool. The arm is movable between a guiding position and a withdrawn position, and the guide is mounted to the arm for moving with the arm so that the guide is at least partially disposed in the feed path when the arm is in the guiding position. A recess is defined in the tool for at least partially accommodating the guide.

In general, another aspect of the disclosure is directed to a method of using an apparatus comprising a tool to operate upon a construct. The method comprises moving a positioning mechanism into a guiding position, in which at least a portion of the positioning mechanism is in a feed path of the apparatus. The tool defines a recess for at least partially accommodating at least a portion of the positioning mechanism. The method further includes feeding a construct along the feed path into the apparatus, and guiding the construct in the tool with at least a portion of the positioning mechanism.

In accordance with one aspect of this disclosure, the above-discussed apparatus, method, aspects, and/or features, in various combinations and/or subcombinations, may be integrated into a system that makes press-formed paperboard containers Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

Figure 1A:
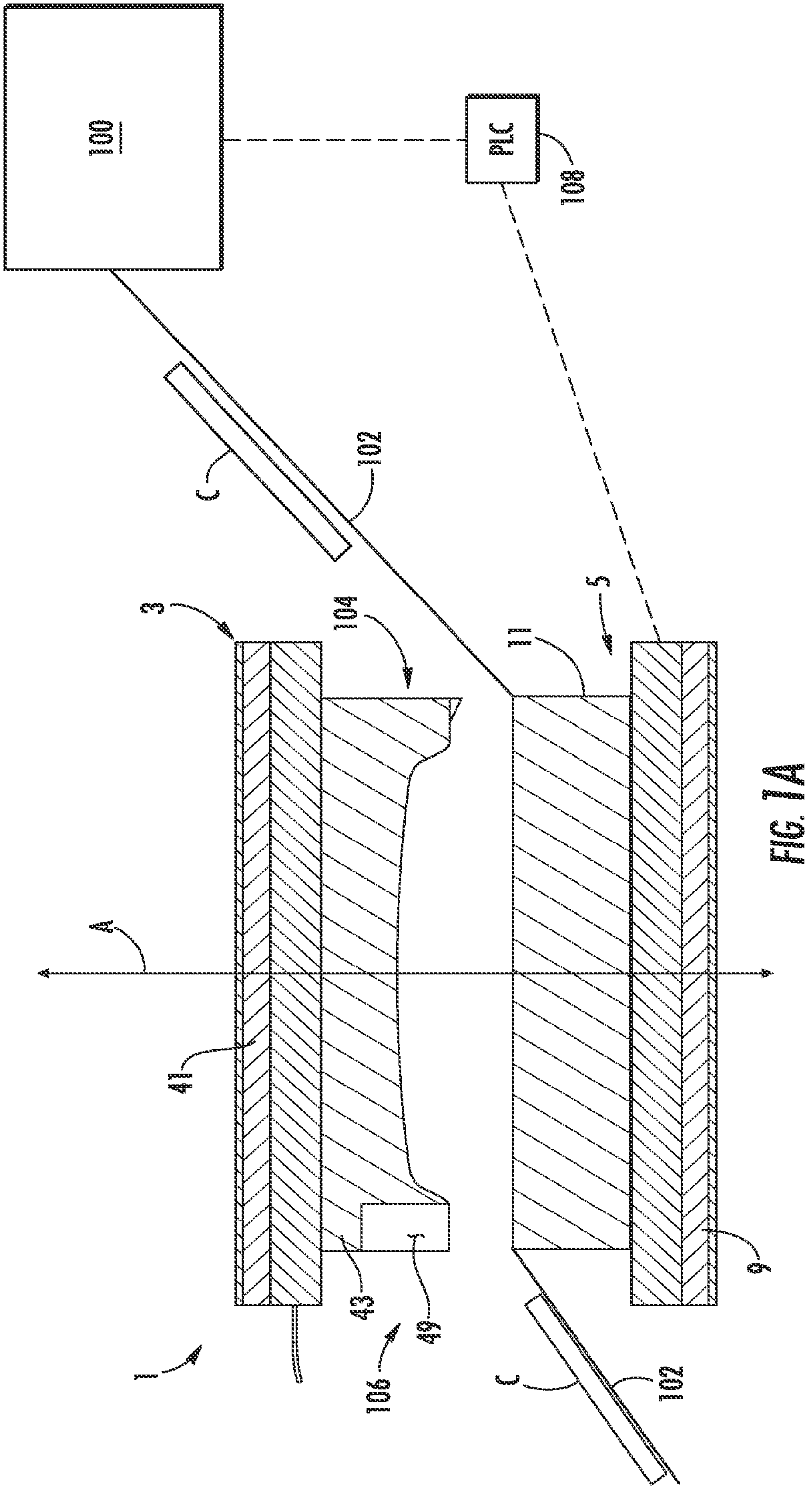
FIGS. 1A and 1B are schematic cross-sectional views of a tool according to one embodiment of the disclosure.

The present disclosure relates generally to various aspects of materials, packages, elements, articles, containers (e.g., press-formed paperboard containers) and methods of making such materials, packages, elements, articles and containers. Although several different features, aspects, implementations, and embodiments are provided, numerous interrelationships between, combinations thereof, and modifications of the various features, aspects, implementations, and embodiments of the disclosure are contemplated hereby. In one illustrated embodiment, the present disclosure relates to forming a container for heating or cooking food items, such as in a microwave oven. However, in other embodiments, the disclosure can be related to forming articles or containers that are not used for microwave cooking.

The present disclosure includes a forming tool 1 for at least partially containing and operating upon (e.g., at least partially forming) a container (e.g., schematically shown in the drawings as a construct C) suitable for use in heating or cooking a food item. For example, the container or construct C may be a press-formed paperboard container, or any other suitable type of container or construct. For example, the container may be similar to the containers disclosed in the following U.S. patents and U.S. patent applications: U.S. Pat. No. 7,365,292; U.S. Pat. App. Pub. Nos. 2005/0109653; 2008/0047958; and 2007/0262487, the disclosures of the above-noted documents being entirely incorporated by reference herein for all purposes. Also, the forming tool 1 of the present disclosure can have similar features as any of the various forming tools and forming features disclosed in the above-identified patents and published patent applications.

Figure 1B:
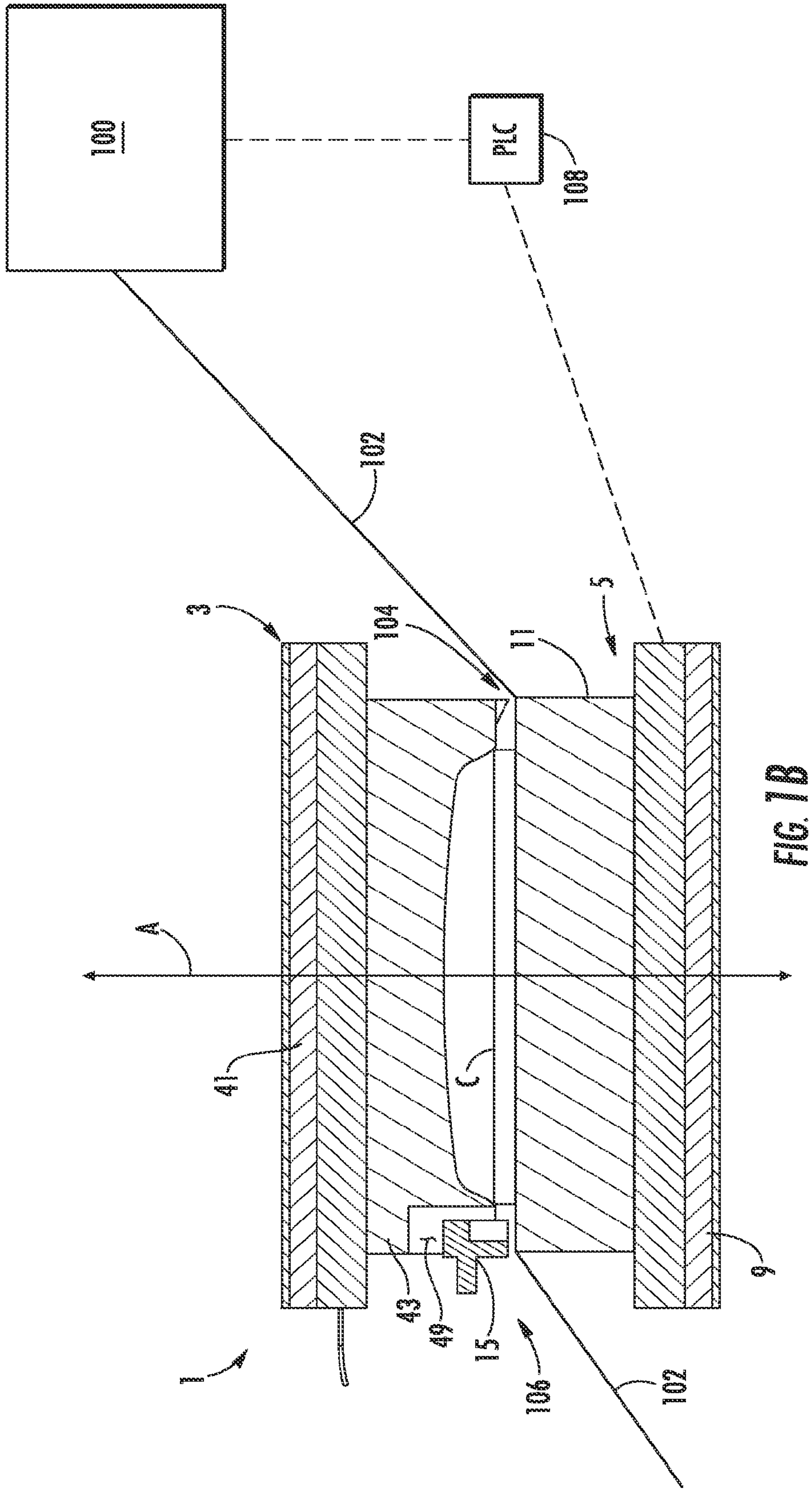

In the illustrated embodiment, a tool assembly or apparatus includes the forming tool 1 and a positioning mechanism 13 mounted on the forming tool or in any other suitable location. As shown in FIGS. 1A and 1B, the forming tool 1 includes an upper (first) tool assembly 3 and a lower (second) tool assembly 5. In one example, the forming tool 1 is a mold assembly, wherein the upper tool assembly 3 and the lower tool assembly 5 are molds (e.g., a concave mold and a convex mold) that define a chamber therebetween for containing and molding or otherwise operating on the construct. The upper and lower tool assemblies 3 and 5 are independently moveable in the vertical direction along a central axis A of the tool to form (e.g., at least partially form) a blank or other construct into the three-dimensional container or any other suitable construct. In the illustrated embodiment, the forming tool 1 is the second forming tool in a two-step process of forming a paperboard blank into a three-dimensional container or other construct. The blank is optionally partially formed into the container in a preceding forming tool 100 (shown schematically in FIGS. 1A and 1B) and is transferred to the forming tool 1 along a feed path 102 for final forming (e.g., final rolling of the edge of the top flange of the container or other forming process). The blank, partially-formed container, fully-formed container, or any other construct C can translate along the feed path 102 from the preceding forming tool 100 into an inlet end 104 of the forming tool 1, and out through an outlet end 106 of the forming tool (FIG. 1A). In an alternative embodiment, the construct C can be fed into the tool 1 from a magazine of constructs, a hopper, or any other apparatus.

Figure 2:
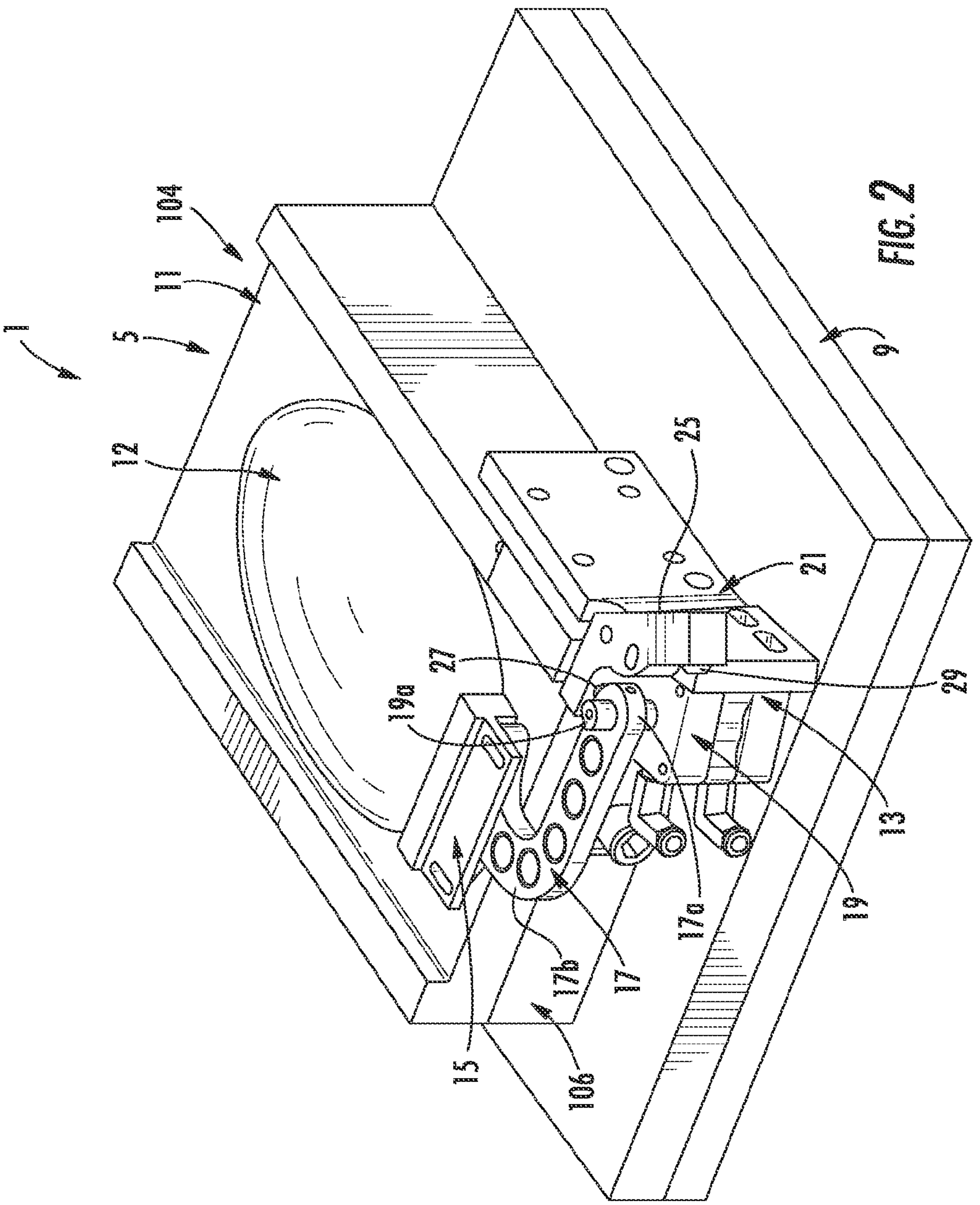
FIG. 2 is an isometric view of a lower assembly of an apparatus according to one embodiment of the disclosure.
Figure 3:
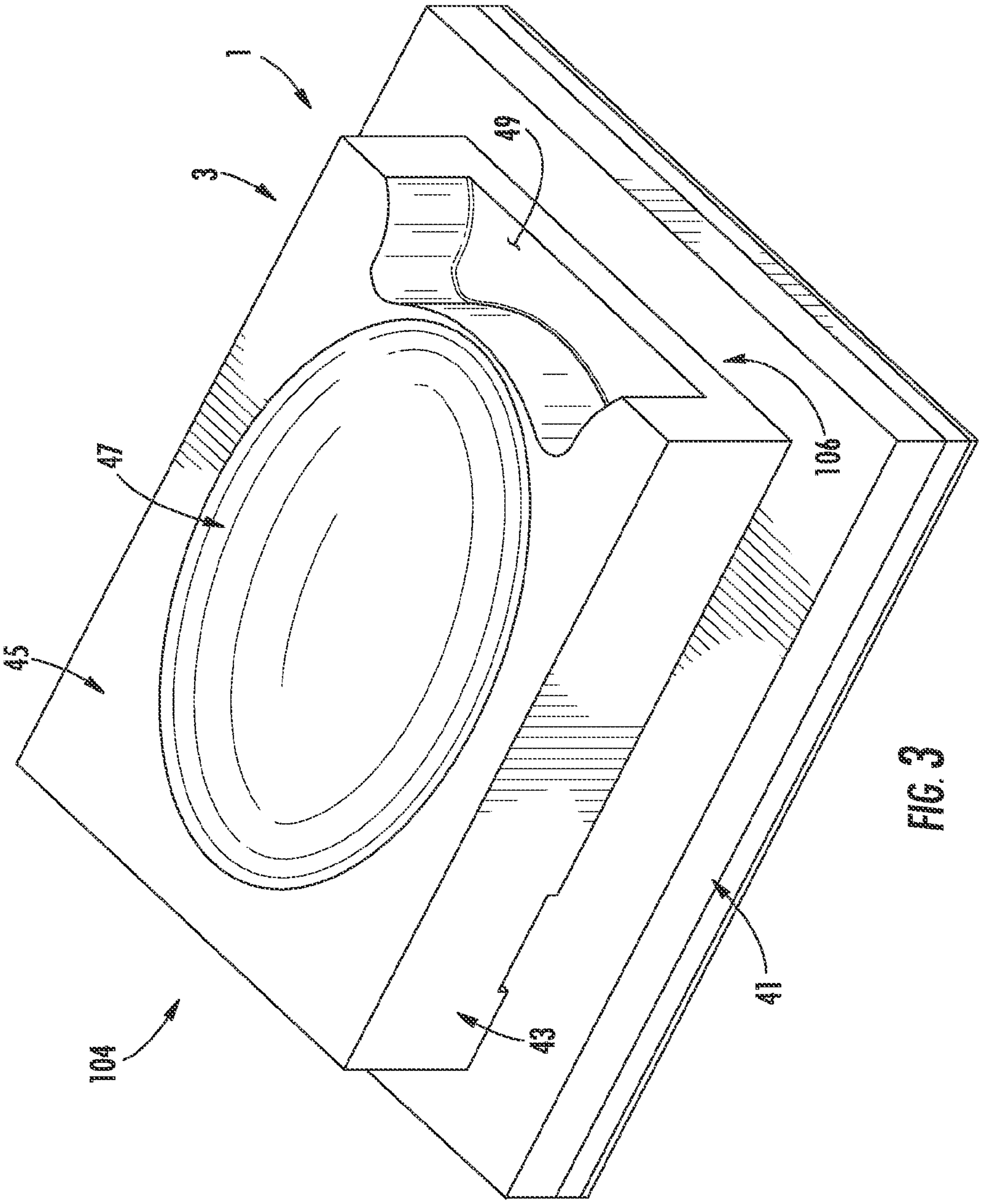
FIG. 3 is an isometric view of an upper assembly of the apparatus according to one embodiment of the disclosure.

As shown in FIGS. 2 and 3, the upper and lower tool assemblies 3, 5 are configured to accommodate a container having a generally oval-shaped bottom wall and upwardly extending side walls that form a generally oval-shaped cavity of the container. The upper and lower forming tool assemblies 3, 5 could be otherwise configured to accommodate or form containers or other constructs having other three-dimensional shapes (e.g., a container with circular-shaped cavity, rectangular-shaped trays, etc.). After being formed from the blank in the forming tool 1, the container can be discharged from the forming tool and can be further handled, package, or subjected to additional forming or shaping processes without departing from the scope of this disclosure.

As shown in FIG. 2, the lower tool assembly 5 has a lower support plate 9 and a lower forming plate 11 mounted on the support plate. In the illustrated embodiment, the lower forming plate 11 has features 12 for forming the container. The lower tool assembly 5 could be otherwise shaped, arranged, and/or configured without departing from the disclosure. The positioning mechanism 13 can be mounted to a side of the lower forming plate 11 and can be positioned adjacent or proximate to the outlet end 106 of the forming tool 1. The positioning mechanism 13 comprises a positioning member or guide 15 connected to an arm 17. In the illustrated embodiment, the arm 17 is connected to an actuator 19, which can be connected to an actuator mounting plate 21 that connects the actuator to the lower tool assembly 5 such as with mechanical fasteners or adhesives. A proximity switch mounting plate 25 is located on top of the actuator mounting plate 21 and adjacent to the arm 17. In the illustrated embodiment, the proximity switch mounting plate 25 is for positioning two proximity switches 27, 29 that detect the position of the arm 17. In one embodiment, the actuator 19 is a pneumatically-operated, rotary cylinder actuator, but the actuator could be any other type of actuator without departing form the disclosure. For example, the actuator could be a linear actuator, or it could be powered by an electric motor.

Figure 4:
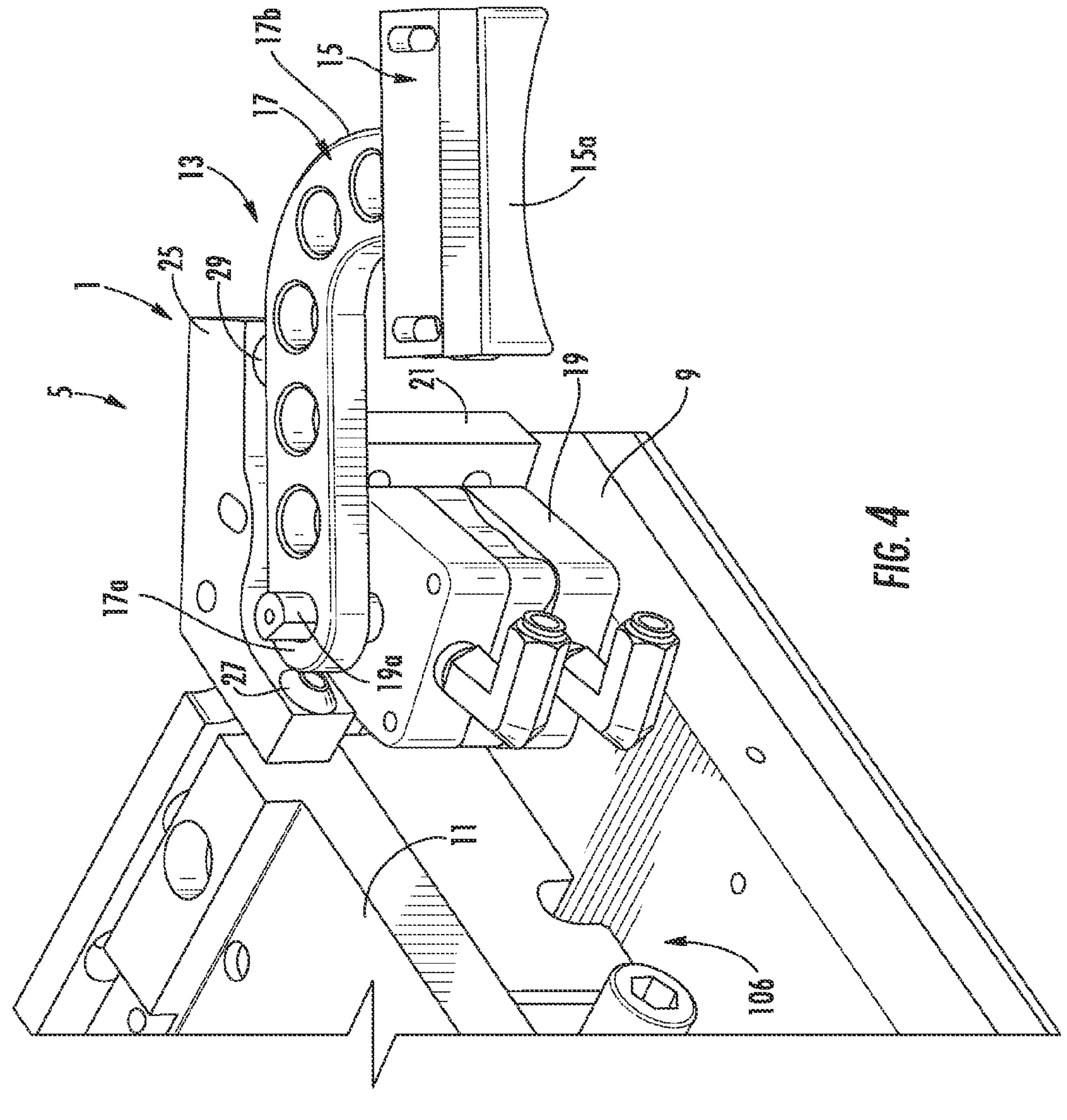
FIG. 4 is an isometric view of a positioning mechanism according to one embodiment of the disclosure.
Figure 5:
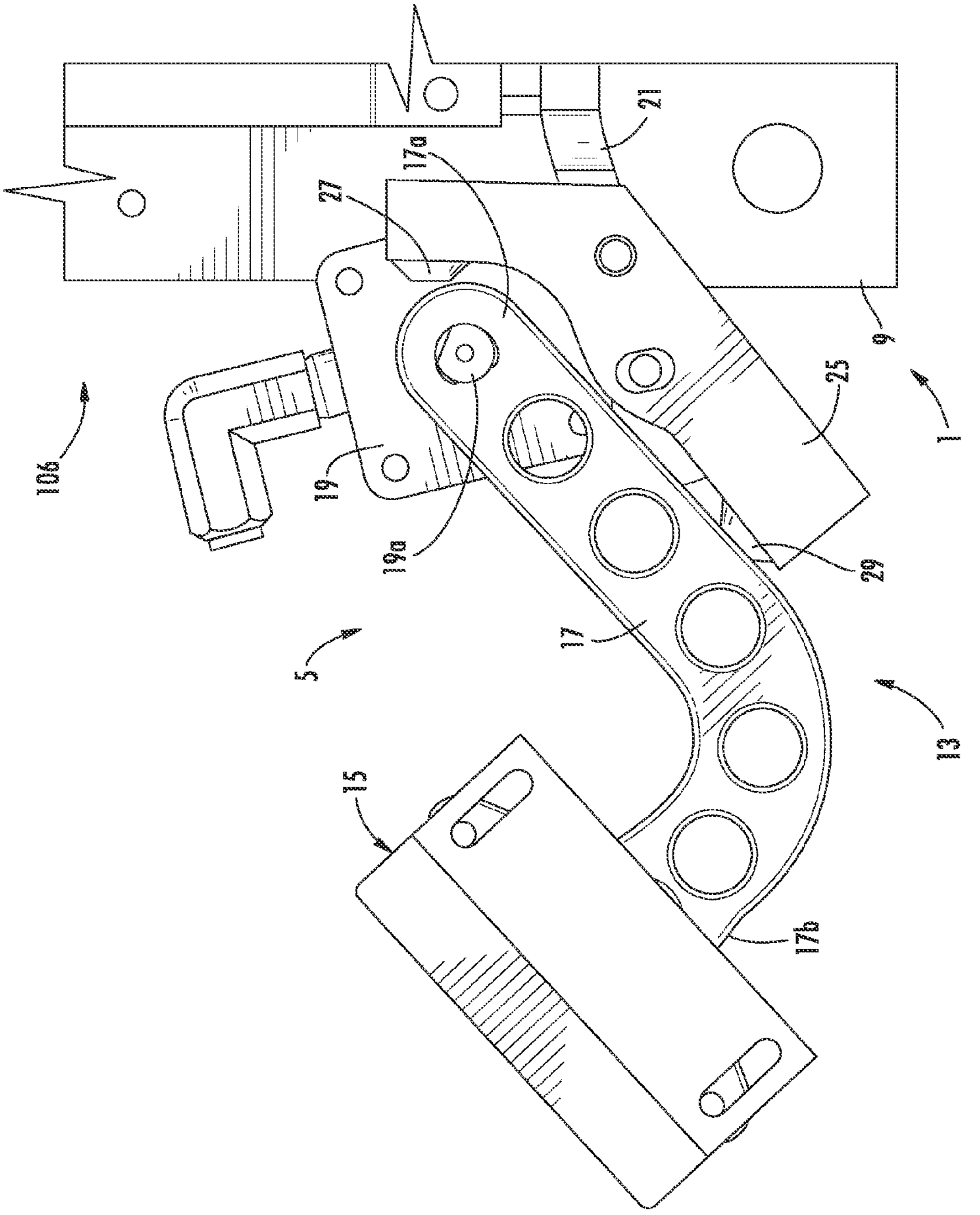
FIG. 5 is a top view of the positioning mechanism of FIG. 4.

As shown in FIGS. 2, 4, and 5, the arm 17 can be connected to an axle 19*a* of the actuator 19 at a pivot end 17*a*. The guide 15 can be mounted to a guide end 17*b* of the arm 17 by mechanical fasteners, adhesive, or otherwise. The guide end 17*b* can be curved so that the guide 15 is generally perpendicular to the movement of the constructs C along the feed path 102, as described below, when the positioning mechanism 13 is in the guiding position (FIG. 2). The guide 15 can include a guide surface 15*a* that contacts the construct C as described below. The guide surface 15*a* can be shaped to correspond to the shape of the construct formed by the apparatus. For example, the guide surface 15*a* can be curved (FIG. 4) in order to correspond to a construct with a curved wall. Alternatively, the guide surface 15*a* can be flat to engage a construct with a flat, vertical wall, in another example. The mounting plate 21 can be angled away from the lower forming plate 11 and the feed path 102 to allow the arm 17 and guide 15 to move completely out of the feed path 102 when the positioning mechanism 13 is moved to the withdrawn position. The positioning mechanism 13 could be otherwise shaped, arranged, and/or configured without departing from the disclosure.

As shown in FIG. 3, the upper tool assembly 3 includes an upper support plate 41 and an upper forming plate 43 mounted to the upper support plate. FIG. 3 shows the upper tool assembly 3 in an inverted position to show the contour of the bottom surface 45 of the upper forming plate 43. In the illustrated embodiment, the upper forming plate 43 has container forming features (e.g., a cavity 47) formed in the bottom surface 45. In one embodiment, the features 12 on the lower tool assembly 5 and the features 47 on the upper tool assembly 3 are complimentary in shape to further form the container from the blank. In one embodiment, the features 12, 47 can be shaped, arranged, and positioned to roll the edge of a top flange of a container formed in the tool 1. In the illustrated embodiment, the upper tool assembly 3 includes a cavity or recess 49 at one end of the upper forming plate 43 and adjacent to the features 47. The recess 49 opens outwardly (e.g., opens away from the features 47 toward the outlet end 106 of the forming tool 1) for accommodating the guide 15 when the upper tool assembly 3 and lower tool assembly 5 are closed or at least partially closed. The upper tool assembly 3 could be otherwise shaped, arranged, and/or configured without departing from the disclosure.

A method of forming the container from the blank according to one embodiment is described below, wherein the blank, container, or partially-formed container is generally referred to as a construct C. The container of the present disclosure can be formed from the blank by feeding the blank into the preceding forming tool 100 and pressing and shaping the blank into a partially-formed container or other construct by operating the preceding forming tool 100. Next, the construct is transferred to the forming tool 1, which can be a second forming tool located in-line with a first forming tool, or the forming tool 1 can be other than the second forming tool (e.g., first, third, etc.). In one embodiment, after a construct C exits the preceding forming tool 100 such as by being ejected by a puff of air or by a pick-and-place apparatus, the construct can translate along the feed path 102 to the inlet end 104 of the forming tool 1. The construct C can travel between stages on a chute or slide under the force of gravity. Alternatively, the construct can be transported between the stages on any conveyor, such as rollers, a belt, etc., or the construct can be manually inserted into the forming tool 1.

When the upper tool assembly 3 and lower tool assembly 5 are separated in an open position (FIG. 1A), the partially formed container can continue along the feed path 102 through the inlet end 104 onto the lower forming plate 11. The positioning mechanism 13 is actuated to position the arm 17 and the guide 15 in the guiding position generally shown in FIG. 2 so that the guide 15 is blocking a portion of the feed path 102 adjacent the forming features 12 of the lower forming plate 11. The positioning mechanism is positioned in the guiding or "stop" position (FIG. 2) to guide the construct C relative to the forming features 12 of the lower tool assembly 5. The construct C can continue translating along the feed path 102 across the lower forming plate 11 until the construct contacts or otherwise engages, the guide surface 15*a* of the guide 15, which stops the forward progress of the construct in the feed path onto the forming features 12. After the construct has contacted the guide 15, the actuator 19 of the positioning mechanism 13 is actuated to position the positioning mechanism to the "withdrawn" position (FIGS. 4 and 5). In one embodiment, one or both of the upper tool assembly 3 and the lower tool assembly 5 can be moved toward a closed position (FIG. 1B) after the positioning mechanism 13 is actuated and before the guide 15 has reached the withdrawn position. Alternatively, the tool 1 can be closed prior to moving the positioning mechanism 13 to the withdrawn position. The location of the recess 49 in the upper forming plate 43 of the upper tool assembly 3 prevents interference of the guide 15 and arm 17 with the upper forming plate as the forming tool 1 closes. For example, FIG. 1B schematically shows the forming tool 1 in a generally closed position with the guide 15 partially received or contained in the recess 49. In an alternative embodiment, the forming tool 1 can be actuated and moved toward the closed position after the guide 15 has been completely positioned in the withdrawn position.

The positioning mechanism 13 and other aspects of the forming tool 1 and the preceding forming tool 100 can be controlled by one or more programmable logic controllers (PLC) 108 (FIGS. 1A and 1B) or any other suitable type of controller. The PLC 108 can receive signals from the two proximity switches 27, 29 to determine if the guide 15 is in the guiding position or the withdrawn position. The proximity switch 27 detects when the guide 15 is in the guiding position, and the proximity switch 29 detects when the guide is in the withdrawn position. The timing of the opening and closing of the forming tool 1, the pivoting of the arm 17 and guide 15 between the guiding and withdrawn positions, and the ejecting of the construct C can be adjusted and optimized according the equipment and conveyors used and the configuration of the same.

In an exemplary embodiment, wherein the forming tool 1 is in the open position of FIG. 1A, the PLC 108 instructs the actuator 19 to pivot the arm 17 until the guide 15 is in the guiding position (FIG. 2) and the arm 17 contacts the proximity switch 27. The PLC 108 then instructs the preceding tool 100 to eject a construct C, which then travels or translates along the feed path 102 in a conventional manner. Then, the construct is stopped or intercepted by the guide 15 as described above. The PLC 108 then instructs the forming tool 1 to move to the closed position, and, as the forming tool is closing, the guide 15 can be at least partially accommodated in the recess 49 (shown schematically in FIG. 1B). The PLC 108 can instruct the actuator 19 to pivot the arm 17 to the withdrawn position before instructing the forming tool 1 to close, as the forming tool is closing, or after the forming tool is moved to a fully closed position, wherein the forming features 12, 47 operate on the construct. When the arm 17 engages the proximity switch 29, which is adjacent the withdrawn position of the positioning mechanism 13 (FIG. 5), the PLC 108 instructs the forming tool 1 to move to the open position (FIG. 1A) and eject the construct C, such as with a puff of air. The construct C can then proceed downstream through the outlet end of the forming tool 1 along the feed path 102 in a conventional manner. The construct C can be further conveyed in the downstream direction along the feed path 102 by a conveying mechanism (e.g., conveyor belt) for further processing, packaging, and/or shipment or for assembly into a finished food product package. The positioning mechanism 13 and the forming tool 1 can be operated in alternative operating steps, methods, or sequence without departing from the disclosure.

In one embodiment, the upper tool assembly 3 and the lower tool assembly 5 can be mounted at approximately a 45° angle in a machine (not shown) of the type manufactured by Peerless Machine & Tool Corporation in Marion, Ind., USA. The machine provides the primary compressive forces to sufficiently close and open the tool assemblies 3, 5 of the present disclosure. The closing and opening of the tool assemblies 3, 5 by the machine forms the three-dimensional articles or containers. In other types of machines, the tool assemblies 3, 5 may be revised/modified to permit the tool assemblies to operate in alternative orientations (e.g., upside down or on their side). It should be understood that the operating position of tool assemblies 3 and 5 shown and/or described herein is not intended to limit the scope of the disclosure.

In accordance with the exemplary embodiment of the present disclosure, the container can optionally include microwave interactive material that may comprise a microwave interactive element such as a susceptor. The container can include microwave interactive elements or material as is disclosed in any of the U.S. patents and Published patent applications that are noted above and incorporated by reference herein. Alternatively, the microwave interactive material can comprise any other type of microwave interactive elements, materials, and/or various combinations of microwave interactive elements and material, as discussed in greater detail below. The microwave interactive elements and materials may be omitted from the container without departing from the scope of this disclosure.

In accordance with one embodiment of this disclosure, the above-discussed aspects, features and methods of this disclosure, various combinations thereof, and/or various subcombinations thereof, are integrated into a system (e.g., a set of tools) that makes press-formed paperboard containers, such that the construct C is a press-formed paperboard container and/or a precursor thereof. The system may be conventional, except for incorporating the above-discussed aspects, features and methods of this disclosure, various combinations thereof, various subcombinations thereof, and/or any other modifications that would be understood by one of ordinary skill in the art in view of this disclosure. The combination of the forming tool 1 and positioning mechanism 13, which may be cooperatively associated with a controller (e.g., PLC 108) and/or other respective aspects, features and methods of this disclosure, provides a very useful, accurate and reliable addition to, for example, the reciprocating tools for press-forming paperboard containers or any similar articles that are made in a similar way, or the like.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

It will be understood by those skilled in the art that while the present disclosure has been discussed above with reference to exemplary embodiments, various additions, modifications and changes can be made thereto without departing from the spirit and scope of the invention as set forth in the claims.

What is claimed is:

1. A method of using an apparatus comprising a tool to operate upon a construct, the method comprising:

moving a positioning mechanism into a guiding position, in which at least a portion of the positioning mechanism is in a feed path of the apparatus;

feeding a construct along the feed path;

guiding the construct in the tool with at least a portion of the positioning mechanism;

then closing the tool upon the construct so that the construct is operated upon by the closed tool, wherein the tool comprises a first forming plate and a second forming plate, and the closing the tool comprises causing relative movement between the first and second forming plates so that the construct is operated upon by the first and second forming plates; and accommodating at least a portion of the positioning mechanism in a recess while simultaneously the tool is closed and the positioning mechanism is in the guiding position, wherein the recess is defined in a forming plate of the first and second forming plates.

2. The method of claim 1, further comprising moving the positioning mechanism into a withdrawn position, and then withdrawing the construct from the tool, wherein:

the positioning mechanism comprises an arm positioned proximate to the tool, the arm being movable between the guiding position and the withdrawn position, and a guide for directing the construct toward the tool, the guide being mounted to the arm for moving with the arm so that the guide is at least partially disposed in the feed path when the arm is in the guiding position;

the moving the positioning mechanism into the guiding position comprises moving the arm so that the arm carries the guide so that the guide becomes at least partially positioned in the feed path; and the moving the positioning mechanism into the withdrawn position comprises moving the arm so that the arm carries the guide so that the guide is at least partially withdrawn from the feed path.

3. The method of claim 2, wherein:

the arm is mounted to an actuator, the method comprises the actuator moving the arm between the guiding position and the withdrawn position, and the actuator is mounted to a mounting plate.

4. The method of claim 3, wherein the mounting plate is mounted to at least one of the first and second forming plates.

5. The method of claim 4, wherein the causing relative movement between the first and second forming plates comprises moving at least one of the first and second forming plates toward the other of the first and second forming plates so that the at least one of the first and second forming plates is moved from an open position to a closed position.

6. The method of claim 5, wherein the recess is defined in the first forming plate, and the mounting plate is mounted to the second forming plate.

7. The method of claim 6, wherein the moving at least one of the first and second forming plates comprises moving the first forming plate from the open position to the closed position.

8. The method of claim 4, wherein the apparatus comprises at least one proximity switch proximate at least one of the guiding position and the withdrawn position of the arm.

9. The method of claim 3, wherein:

the actuator is a rotary actuator and the arm is mounted to the rotary actuator at one end of the arm so that the rotary actuator is operable to pivot the arm between the guiding position and the withdrawn position of the arm; and the actuator moving the arm between the guiding position and the withdrawn position comprises the rotary actuator pivoting the arm between the guiding position and the withdrawn position.

10. The method of claim 2, wherein:

the guide comprises a curved portion for engaging a construct having a curved side; and the method comprises the curved portion of the guide engaging the curved side of the construct.

11. The method of claim 1, further comprising moving the positioning mechanism into a withdrawn position.

12. The method of claim 1, further comprising withdrawing the positioning mechanism from the feed path, and then moving at least a portion of the tool toward an open position.

13. The method of claim 12, wherein the moving at least a portion of the tool toward the open position occurs in response to the withdrawing of the positioning mechanism.

14. The method of claim 12, further comprising ejecting the construct from the apparatus.

15. The method of claim 14, wherein:

the tool comprises an inlet end and an opposing outlet end, the feeding the construct comprises feeding the construct into the inlet end of the tool onto the first forming plate of the tool, and the ejecting the construct comprises ejecting the construct through the outlet end of the tool.

16. The method of claim 15, wherein the moving the positioning mechanism into the guiding position comprises moving a guide portion of the positioning mechanism into the feed path on the outlet end of the tool.

17. The method of claim 16, wherein the guiding the construct in the tool comprises stopping movement of the construct along the feed path with the guide portion of the positioning mechanism.

18. The method of claim 12, wherein:

the moving the positioning mechanism into the guiding position comprises pivoting an arm of the positioning mechanism to move a guide portion of the positioning mechanism into the feed path, and the withdrawing the positioning mechanism from the feed path comprises pivoting the arm to move the guide portion out of the feed path.

19. The method of claim 1, wherein:

the recess is defined in the first forming plate of the tool, and the causing relative movement between the first and second forming plates comprises moving the first forming plate toward the second forming plate.

20. The method of claim 1, wherein:

the method comprises a method of at least partially forming a press-formed paperboard container, and the closing of the tool upon the construct comprises at least partially press-forming the paperboard container in the tool.

21. A method according to claim 1, wherein:

the first forming plate is a first mold;

the second forming plate is a second mold;

the tool is a mold assembly comprising the first and second molds between which there can be relative movement for opening and at least partially closing a chamber cooperatively defined by the first and second molds;

the closing the mold assembly upon the construct comprises the chamber at least partially containing and operating upon the construct; and the first mold defines the recess such that the recess is outwardly open while the mold assembly is closed.

22. The method according to claim 21, wherein:

the recess comprises a sidewall that is curved according to the shape of the chamber and two end walls that are spaced apart to accommodate a width of a guide portion of the positioning mechanism, and the accommodating at least the portion of the positioning mechanism in the recess comprises positioning at least a portion of the guide portion within the recess.

23. A method of using an apparatus comprising a tool to operate upon a construct, the method comprising:

moving a positioning mechanism into a guiding position, in which at least a portion of the positioning mechanism is in a feed path of the apparatus, wherein the tool defines a recess for at least partially accommodating at least a portion of the positioning mechanism;

feeding a construct along the feed path into the apparatus;

guiding the construct in the tool with at least a portion of the positioning mechanism;

moving at least a portion of the tool toward a closed position, in which at least a portion of the positioning mechanism is received in the recess defined by the tool;

withdrawing the positioning mechanism from the feed path, and then moving at least a portion of the tool toward an open position; and ejecting the construct from the apparatus, wherein the tool comprises an inlet end and an opposing outlet end, the feeding the construct comprises feeding the construct into the inlet end of the tool onto a first forming plate of the tool, and the ejecting the construct comprises ejecting the construct through the outlet end of the tool, and wherein the recess is defined in a second forming plate of the tool, and the moving at least a portion of the tool toward the closed position comprises moving at least one of the first and second forming plates towards the other.

24. The method of claim 23, comprising the at least a portion of the positioning mechanism being in the recess defined by the tool during simultaneous occurrence of:

the at least the portion of the positioning mechanism being in a feed path, and the at least the portion of the tool being in the closed position.

25. The method of claim 23, wherein the moving the positioning mechanism into the guiding position comprises moving a guide portion of the positioning mechanism into the feed path on the outlet end of the tool.

26. The method of claim 25, wherein the guiding the construct in the tool comprises stopping movement of the construct along the feed path with the guide portion of the positioning mechanism.

* * * * *